United States Patent [19]

Baldwin, Sr.

[11] Patent Number: 4,917,485

[45] Date of Patent: Apr. 17, 1990

[54] SAFETY MIRROR SYSTEM FOR VEHICLES

[76] Inventor: William K. Baldwin, Sr., 14219 Decatur Dr., Magalia, Calif. 95954

[21] Appl. No.: 361,634

[22] Filed: Jun. 5, 1989

[51] Int. Cl.⁴ .......................... G02B 5/10; B60R 1/08
[52] U.S. Cl. .................................... 350/627; 350/625
[58] Field of Search ............... 350/600, 604, 606, 612, 350/616, 618, 623, 624, 625, 626, 627; 248/468, 476

[56] References Cited

U.S. PATENT DOCUMENTS

| | | | |
|---|---|---|---|
| 2,911,177 | 11/1959 | West | 350/625 |
| 3,063,344 | 11/1962 | Slate | 350/631 |
| 3,667,833 | 6/1972 | Baldwin, Sr. | |
| 4,303,308 | 12/1981 | Kobrin | 350/625 |

*Primary Examiner*—Rodney B. Bovernick
*Assistant Examiner*—Terry S. Callaghan

[57] ABSTRACT

A system using appliances in the form of sectional mirrors allows drivers wide-angle viewing of approaching traffic to the rear and on both side of the system equipped vehicle. The system appliances include an in-vehicle mirror having as sections a convex upper mirror portion and a flat lower mirror portion. The in-vehicle mirror is used individually or in cooperation with one or more outside mirrors of similar structure. The flat lower mirror portions allow regular rear viewing and the convex upper mirror portions provides wide angle viewing to the rear and on both sides of the system equipped vehicle. A preset tilting of the convex mirror surfaces outwardly at the top and inwardly at the bottom in an adjusted relationship to the flat mirror surfaces allows the driver to see a reduced version in a wider plane in the convex mirror surfaces of the same image reflected in the flat mirror surface.

3 Claims, 4 Drawing Sheets

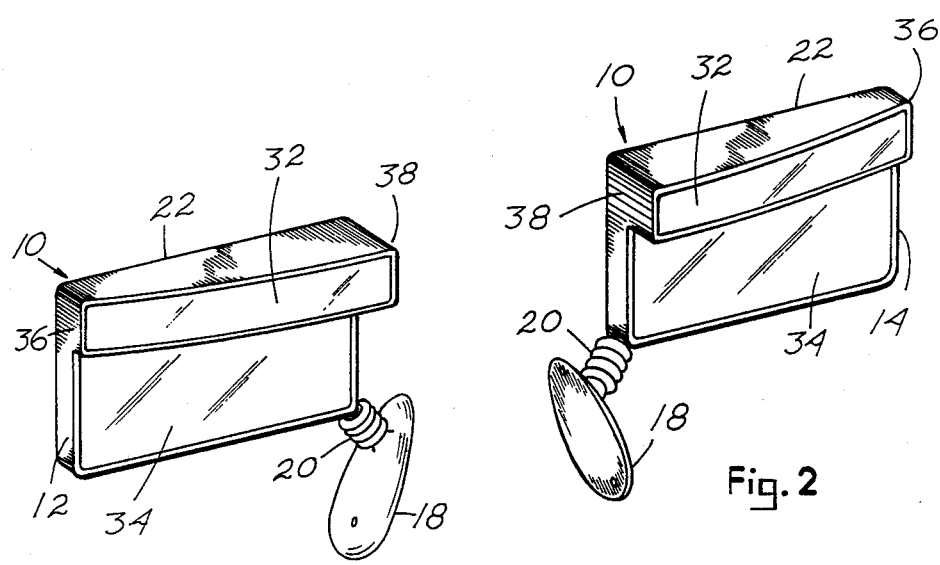
Fig. 1
Fig. 2
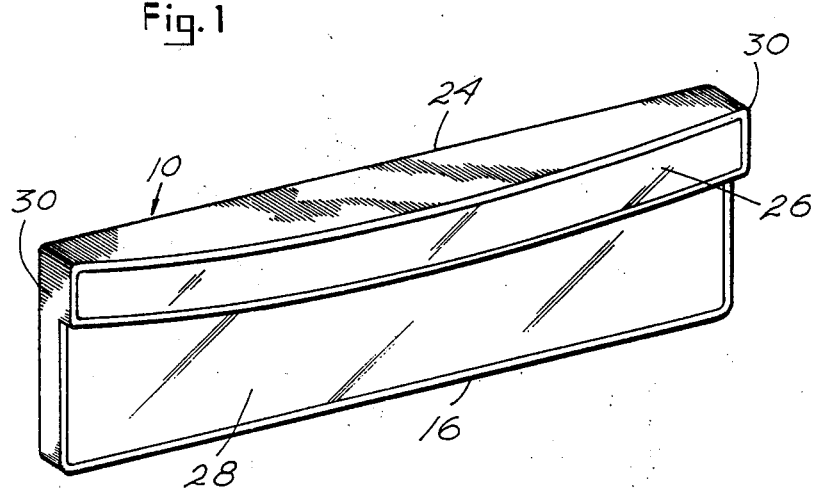
Fig. 3

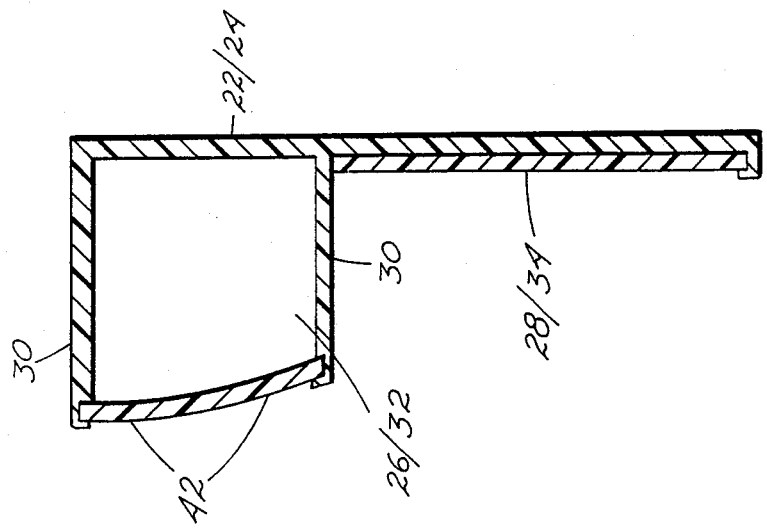
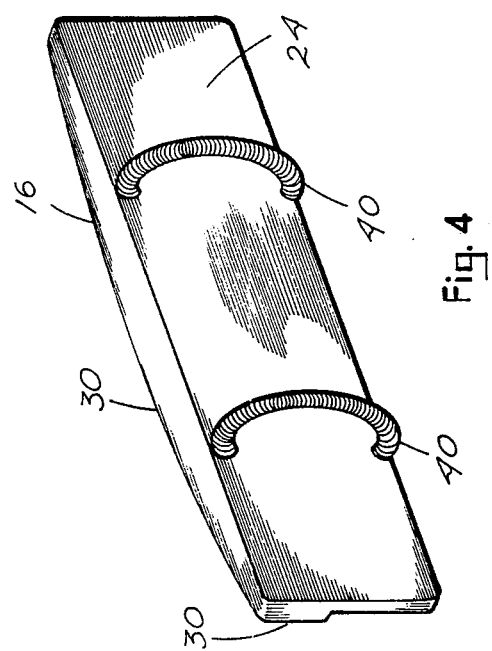

SAFETY MIRROR SYSTEM FOR VEHICLES

BACKGROUND OF THE INVENTION

1. Field of the Invention

The invention relates to rear view mirror systems for vehicles. The present invention is particularly directed towards convex mirrors allowing a widened view of traffic approaching from the rear of a road driven vehicle. Although road driven vehicles are the principal users of this type of mirror system, the present invention is well suited for a variety of applications where wide-view rear surveillance is important.

2. Description of the Prior Art

Development of a system for full rear and side viewing of traffic approaching the rear of a road driven vehicle has been somewhat slow being consummated into a viable end product. A variety of convex mirror or mirrors with a convex center for both side and center vehicle attachment are offered in the market place now. These circular mirrors distort the images of the viewed object and can lead to judgement failures on the part of drivers depending upon them for reflected information. Several mirror devices have been offered in which a multiplicity of individually stepped mirrors are horizontally aligned with the device designed for attachment at the top of the windshield in front of the driver. These devices, the convex mirrors and the stepped aligned mirrors, require considerable driver concentration to ascertain accurately the position of a rear approaching vehicle. My mirror system uses a half-rounded convex upper mirror immediately above the original flat mirror inside and outside on both sides of a vehicle. This allows wide accurate reflected viewing of rear approaching traffic centrally and on both sides of the equipped vehicle far superior to those mirror systems now in use.

SUMMARY OF THE INVENTION

Therefore, in practicing my invention, I have provided a mirror system, particularly for road driven vehicles, which allows wide-angle viewing of approaching traffic to the rear and on both sides of the mirror equipped vehicle. My mirror system includes a substantially rectangular in-vehicle mirror designed for longitudinal horizontal attachment centrally in the standard motor vehicle attachment mode. The in-vehicle mirror used in my system, however, has a horizontally aligned convexed upper section and a flat mirrored lower section. Although the in-vehicle mirror alone is adequate to provide an expanded rear view system, the addition of one or more side mirrors enhances rearward side viewing. As the original and required automotive side mirrors are generally flat surfaced, I prefer to replace them with my system-type side mirrors. At least, the driver side mirror should be a system mirror and with both outside mirrors replaced, my system becomes fully functional. So included in a preferred embodiment of my system are two outside mirrors attached in normal proximity to and replacing the original outside mirrors on the vehicle. The outside mirrors useful as appliances in my system have flat original mirror lower sections and half curved upper convex sections in a one-piece housing. The outside mirror surfaces of the upper sections are convex and curve outward from a widened base structure on the vehicle attachment side to almost even with the flat mirror surface at the opposite edge. It is very important, and what makes my system unique, is that the in-vehicle mirror is somewhat longer than a regular automobile mirror and the convex upper section has a vertical slant or tilt outward at the top to inward at the bottom in relationship to the flat plane surface of the flat lower section of the mirror. The in-vehicle mirror is housed in a one-piece housing and the convex mirror tilt is aligned and preset for optimum results. The convex surfaces of the side mirrors are also tilted top outward to the front bottom inward to the rear in this same manner. This tilting of the convex mirror surfaces in relation to the flat mirror surfaces allows the driver to see in the same plane when looking into either the flat mirror surface or the convex mirror surface both in front of him and to his sides.

Therefore, it is a primary object of my invention to provide a rear view mirror system for vehicles which widens the range of rear and side viewing for the vehicle driver.

Another object of the invention is to provide a rear view mirror system for vehicles using mirrors as appliances in which the mirrors have convexed upper portions and flat lower portions with the convexed portions tilted in relationship to the flat portions so the convexed mirror surfaces provide a wide angle reduced image accurately of the same image a vehicle driver see in the flat mirror surfaces.

A further object of the invention is to provide a safety mirror system for vehicles using as appliances one or more sectional mirrors structured in a manner allowing the vehicle driver to view reflected images flat or convexed in the same plane to prevent the driver from receiving distorted and unreal rear visual information.

Other objects and advantages will be seen from reading the specification and reviewing the drawings which will show that mirrors used in my system are structured to provide an accurate and wide plane of reliable visual information concerning vehicles approaching from both sides and the rear of the system equipped vehicle.

BRIEF DESCRIPTION OF THE DRAWINGS

In the drawings:

FIG. 1 is a perspective view showing the vehicle driver side outside mirror being an appliance of the system according to the present invention.

FIG. 2 is a perspective view showing the vehicle passenger side outside mirror being an appliance of the system of the present invention.

FIG. 3 is a perspective view showing the in-vehicle mirror being an appliance according to the system of the invention with FIG. 1, FIG. 2, and FIG. 3 being illustrative of the system appliances.

FIG. 4 shows the attachment side of the in-vehicle mirror of FIG. 3 illustrating springs as a snap-on method for attaching the system mirror to the existing vehicle mirror.

FIG. 5 is a side sectional view of the in-vehicle mirror of FIG. 3 illustrating the tilt of the upper convex mirror in relation to the flat vertical plane of the flat mirror.

BEST MODE FOR CARRYING OUT THE INVENTION

Figure 7:
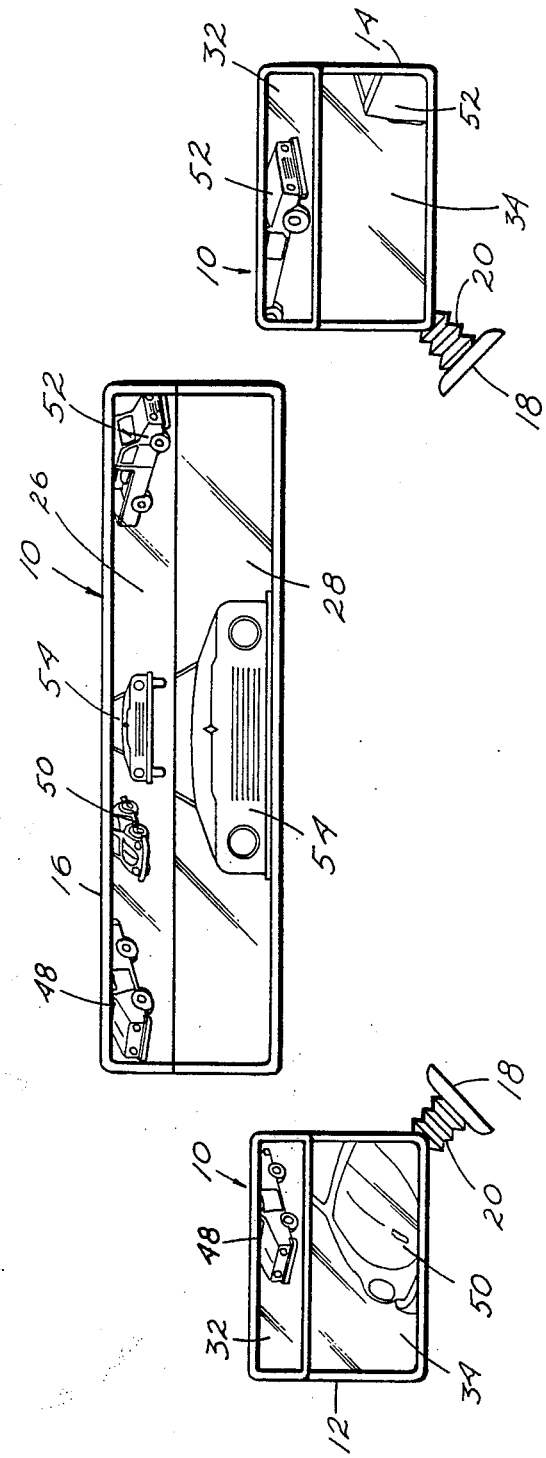
FIG. 7 is a frontal view of the mirror system of the present invention illustrated from the driver's view showing the front regular and reduced size reflected images of approaching rear and side vehicles.

Referring now to the drawings at FIG. 1, FIG. 2, and FIG. 3 where the system mirrors are illustrated and designated general system mirror appliances 10. In perspective illustrations, FIG. 1 shows driver side outside mirror 12, FIG. 2 shows passenger side outside mirror 14, and FIG. 3 shows in-vehicle mirror 16. The relative positioning of the three system mirrors is best illustrated in FIG. 7. Driver side mirror outside mirror 12 in FIG. 1 has outside mirror one-piece housing 22 shown ready for attachment to a vehicle by outside mirror attachment brackets 18 and adjustable for view line by mirror position adjustments 20. Passenger side outside mirror 15 in FIG. 2 is of similar structure reversely oriented to driver side outside mirror 12 in FIG. 1. An oppositely disposed outside mirror one-piece housing 22 has outside mirror brackets 18 for vehicle attachment and mirror position adjustments 20 in reversed position. It will be noted that the outside mirrors of FIG. 1 and FIG. 2, if positioned together, form a single embodiment similar to in-vehicle mirror 16 shown in FIG. 3. Both outside system mirrors are divided into two portions, outside mirror half convex upper portion 32 and outside mirror lower flat portion 34. It is important to note that mirror half convex upper portions 32 are tilted, see FIG. 5, outward at the top and inward adjacent the tops of outside mirror lower flat portions 34. The convex mirror tilting is important and will be explained further on in this specification. On both outside mirrors 12 and 14, outside mirror one-piece housing 22 has a narrow projecting convex mirror support end, outside housing half convex mirror support 36, and an extended convex mirror support end, outside extended half convex mirror support 38. The extended convex mirror support ends 38 are positioned oppositely disposed when the outside mirrors 12 and 14 are attached to a vehicle by outside mirror attachment brackets 18.

FIG. 3 illustrates the system in-vehicle mirror 16. In-vehicle mirror 16 is housed in in-vehicle mirror one-piece housing 24 and is structured with inside mirror upper full convex portion 26 affixed upward and inside mirror lower flat portion 28 affixed downward. Inside mirror upper full convex portion 26 is additionally supported by in-vehicle housing convex mirror supports 30 which are short extensions of the end frame of in-vehicle mirror one-piece housing 24. In FIG. 4, a rear view of in-vehicle mirror one-piece housing 24 is shown illustrating a method of attaching in-vehicle mirror 16 to the existing vehicle or automobile mirror by snap-over springs, attachment springs 40. Although FIG. 4 is illustrative of a mirror attachment method it is not meant to limit attachment of in-vehicle mirror 16 to a particular method or from actually being attached to the vehicle as a replacement for the original mirror.

Referring now to FIG. 5 which is a sectional side view of the outside mirror structure and generally criterion for the in-vehicle mirror structure. Both outside mirrors 12 and 14 have one-piece housing as has in-vehicle mirror 16 and for illustration designated in FIG. 5 as 22/24. Both outside mirrors 12 and 14 have lower flat mirror portions for illustration designated in FIG. 5 as 28/34. Outside mirrors 12 and 14 have half width outside mirror half convex upper portions 32 and invehicle mirror 16 has a full width upper convex portion, inside mirror upper full convex portion 26, which are designated in FIG. 5 as 26/32 to illustrate convex mirror tilt 42 which is common to all three convex mirror portions. Convex mirror tilt 42 is unique to the system of the present invention in that the relationship of convex mirror tile 42, outward at the top and inward at the bottom, to flat mirror surfaces 28/34 provides an undistorted similar rear view of approaching vehicles reflecting the same viewing plane though reduced in size in the convex mirror portions. Convex mirror tilt 42 is preset in relationship to the flat mirror surfaces for optimum results and is a fixed positioning of the convexed mirrors in outside mirror one-piece housing 22 and in in-vehicle mirror one-piece housing 24.

Figure 6:
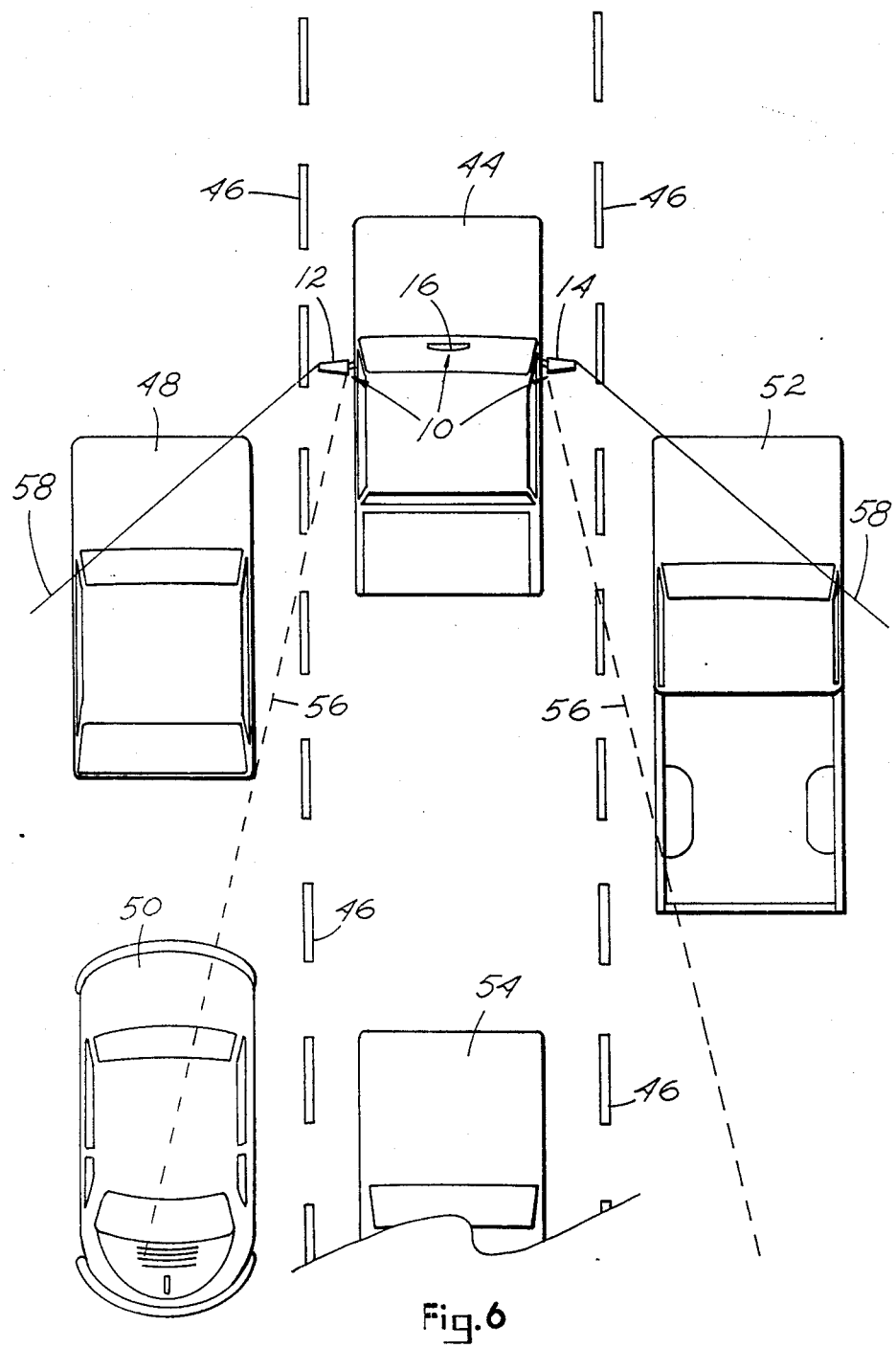
FIG. 6 is a top plan view in illustrative diagrammatic form showing the wide scope of rear and side vision afforded a frontal vehicle affixed with the mirror system according to a preferred embodiment of the invention.

FIG. 6 is a top plan view diagrammatically illustrating how the system according to the present invention increases driver field of vision, extended driver field of vision 58 (solid lines), over normal driver field of vision 56 (dotted lines). Considering the top view of vehicles on a highway driving between highway lane markers 46 in FIG. 6 in conjunction with the same vehicles seen from the driver's point of view in the system mirrors at FIG. 7, and the advantages of the present invention become obvious. The drawings are meant to be indicative of what can be seen on both sides of system equipped vehicle 44.

First left side approaching vehicle 48 would be seen in outside half convex mirror 32 and inside convex mirror 26. Second left side approaching vehicle 50 would be seen in both inside convex mirror 26 and in outside mirror lower flat portion 34 as shown in the driver side flat portion illustratively. Center rear approaching vehicle 54 is seen in inside mirror lower flat portion 28 and in a reduced reflection in inside mirror upper full convex portion 26. Right side approaching vehicle 52 would be seen in the right hand side of inside mirror upper full convex portion 26 of in-vehicle mirror 16, in outside mirror half convex upper portion 32 and partially in outside mirror lower flat portion 34. In the convex mirror portions of the system, reduced images of the rear approaching vehicles are seen as compared to the size of the images seen in the flat portions of the system mirrors.

Although a three-mirror system is preferred in the immediate invention for optimum results, the system of the present invention could be functional as a one or two mirror system. In-vehicle mirror 16 as structured with inside mirror upper full convex portion 26 and inside mirror lower flat portion 28 could be used efficiently as a single mirror system. In-vehicle mirror 16 would function effectively with driver side outside mirror 12 or passenger side outside mirror 14 as a two-mirror system. Therefore, it is to be understood that the system disclosed in this specification is not necessarily limited to a specific number of appliances.

As previously mentioned, the convex mirrors used in this system are tilted top out and bottom in, see FIG. 5, convex mirror tilt 42, to produce a reduced size image relatively the same as the larger image seen in the lower flat mirror portions. This is important so that driver disorientation does not occur because dissimilar images of the same vehicle appear which misleads the driver into believing two vehicles are approaching. Fully rounded convex mirrors now in use have been known to produce the multiple vehicle phenomenon. My system overcomes this defect.

Thus having described preferred embodiments of my safety mirror system for vehicles with considerable details, I wish it understood that I may make modifications to the system and the described appliances so long as modifications made remain within the intended scope of the appended claims and if anyone else makes modifications to the system or the appliances described which obviously copy or modify this invention and these modifications fall within the intended scope of my claims, I will considered these modified inventions to be one and the same with my invention.

What I claim is:

1. A safety mirror system for a vehicle, comprising at least one elongated mirror having distinctly different upper and lower viewing divisions and adapted for attachment inside said vehicle in a location providing rear surveillance for a vehicle driver cooperative with at least two small mirrors being longitudinal right half and left half duplicates of said elongated mirror, said small mirrors adapted for external attachment to said vehicle with one on each side of said vehicle for side viewing; wherein said upper division of said elongated mirror is comprised of a convex mirror mounted in protruding frames which arch centrally and curve back to reduce protrusions adjacent outer ends of said elongated mirror; wherein said upper divisions of said small mirrors are formed in essentially the same manner as the upper division of the elongated mirror with the exception that the convex mirrors are truncated at the apex of the arch defined by the convex mirror of the upper division of the elongated mirror; and wherein said convex mirrors of said upper divisions of both said elongated mirror and said small mirrors are angled with the upper edge out and the lower edge in relative to planar surfaces of said mirrors in said lower divisions.

2. The safety mirror system for a vehicle of claim 1 wherein said elongated mirror adapted for attachment inside said vehicle has said adaption provided by spaced loops of coiled springs affixed transversely on a non-reflective surface of said mirror arranged for slide-on temporary attachment to existing mirrors in said vehicle.

3. The safety mirror system for a vehicle of claim 1 wherein each said small mirrors adapted for external attachment to said vehicle has said adaption provided by adjustable corner mounts attachable to a side of said vehicle.

* * * * *